United States Patent
Okuda et al.

(10) Patent No.: US 9,260,619 B2
(45) Date of Patent: Feb. 16, 2016

(54) WHITE INK COMPOSITION AND RECORDED MATERIAL USING THE SAME

(75) Inventors: Ippei Okuda, Shiojiri (JP); Shuichi Koganehira, Matsumoto (JP); Hironori Sato, Shiojiri (JP); Tsuyoshi Sano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 180 days.

(21) Appl. No.: 13/095,089

(22) Filed: Apr. 27, 2011

(65) Prior Publication Data

US 2011/0262724 A1 Oct. 27, 2011

(30) Foreign Application Priority Data

Apr. 27, 2010 (JP) ................... 2010-101923
Apr. 27, 2010 (JP) ................... 2010-101924

(51) Int. Cl.
| | | |
|---|---|---|
| C09D 11/322 | (2014.01) | |
| C09D 11/326 | (2014.01) | |
| C08L 75/04 | (2006.01) | |
| C08L 23/04 | (2006.01) | |
| C08L 27/06 | (2006.01) | |
| C08L 27/12 | (2006.01) | |

(52) U.S. Cl.
CPC .............. *C09D 11/326* (2013.01); *C08L 23/04* (2013.01); *C08L 27/06* (2013.01); *C08L 27/12* (2013.01); *C09D 11/322* (2013.01); *C08L 75/04* (2013.01); *Y10T 428/24901* (2015.01)

(58) Field of Classification Search
CPC ....... C09D 11/322; C08L 75/04; C08L 27/06; C08L 27/12; C08L 23/04
USPC ...................................................... 524/487
See application file for complete search history.

(56) References Cited

U.S. PATENT DOCUMENTS

| | | | |
|---|---|---|---|
| 3,562,754 | A | 2/1971 | Placido |
| D273,961 | S | 5/1984 | Bassey |
| 4,880,465 | A | 11/1989 | Loria et al. |
| 5,335,796 | A | 8/1994 | Sanford et al. |
| 5,403,872 | A | 4/1995 | Koreska |
| 5,531,038 | A | 7/1996 | Keith |
| 6,025,413 | A | 2/2000 | Xu et al. |
| 6,204,307 | B1 | 3/2001 | Miyabayashi |
| 6,227,504 | B1 | 5/2001 | Seaberg |
| 6,653,367 | B2 | 11/2003 | Miyabayashi |
| 6,745,989 | B2 | 6/2004 | Domasin |
| 7,098,262 | B2 | 8/2006 | Kim et al. |
| D545,095 | S | 6/2007 | Lomas |
| 7,513,945 | B2 | 4/2009 | Nakano et al. |
| 7,527,235 | B2 | 5/2009 | Hummel |
| 7,955,425 | B2 | 6/2011 | Koganehira et al. |
| 2007/0060734 | A1* | 3/2007 | Bruchmann et al. ............ 528/75 |
| 2008/0070015 | A1* | 3/2008 | Fischer .................... 428/211.1 |
| 2009/0176071 | A1 | 7/2009 | Koganehira et al. |
| 2009/0182098 | A1 | 7/2009 | Sano et al. |
| 2009/0220695 | A1* | 9/2009 | Oyanagi et al. ............... 427/256 |
| 2009/0246479 | A1 | 10/2009 | Mukai et al. |
| 2010/0010121 | A1* | 1/2010 | Koganehira et al. ........... 524/90 |
| 2010/0039463 | A1* | 2/2010 | Van Thillo et al. ............... 347/9 |
| 2011/0084183 | A1 | 4/2011 | Kim |
| 2011/0184108 | A1* | 7/2011 | Okuda et al. .................. 524/377 |
| 2011/0300298 | A1 | 12/2011 | Kamibayashi et al. |
| 2012/0040155 | A1 | 2/2012 | Komatsu et al. |
| 2012/0079960 | A1 | 4/2012 | Okuda et al. |
| 2012/0176441 | A1* | 7/2012 | Kagata et al. .................. 347/20 |

FOREIGN PATENT DOCUMENTS

| | | |
|---|---|---|
| CN | 1639256 A | 7/2005 |
| EP | 2154210 A2 | 2/2010 |
| JP | 60-008376 A | 1/1985 |
| JP | 11-349875 A | 12/1999 |
| JP | 2002-080761 A | 3/2002 |
| JP | 2004-339388 A | 12/2004 |
| JP | 2004-352768 A | 12/2004 |
| JP | 2005-048108 A | 2/2005 |
| JP | 2006-96933 A | 4/2006 |
| JP | 2007-016103 A | 1/2007 |
| JP | 2007-194175 A | 8/2007 |
| JP | 2008-13714 A | 1/2008 |
| JP | 2008-120846 A | 5/2008 |
| JP | 2009-96914 A | 5/2009 |
| JP | 2009-138077 A | 6/2009 |
| JP | 2009-138078 A | 6/2009 |
| JP | 2009-242441 A | 10/2009 |
| JP | 2009-242482 A | 10/2009 |
| JP | 2009-286998 A | 12/2009 |

OTHER PUBLICATIONS

European Search Report, Application No. 11163647.8, dated Jul. 1, 2011.

* cited by examiner

*Primary Examiner* — Angela C Scott
(74) *Attorney, Agent, or Firm* — Nutter McClennen & Fish LLP

(57) ABSTRACT

A white ink composition contains a white pigment and fixing resins. The fixing resins include a vinyl chloride resin or a urethane resin, a fluorene resin, and a polyolefin wax.

12 Claims, No Drawings

WHITE INK COMPOSITION AND RECORDED MATERIAL USING THE SAME

BACKGROUND

1. Technical Field

The present invention relates to a white ink composition and a recorded material using the same.

2. Related Art

White ink compositions containing a white pigment such as a metal oxide (titanium dioxide, zinc oxide, silica, alumina, magnesium oxide, etc.), barium sulfate, or calcium carbonate have been used in various printing methods. For example, for printing a color image on a recording medium whose base color is not white, such as a plastic or metal medium, a white ink composition may be used to cover the base color to enhance the color developability of the color image. Also, for recording a color image on a transparent sheet, a white ink composition may be used to form a white mask layer on the sheet for reducing the transparency of the color image.

Such a white ink composition may contain a fixing resin to fix the white pigment to the recording medium. JP-A-2009-96914 discloses a white ink composition for textile printing, containing a white pigment, a polyurethane resin having a glass transition temperature of −35 to 10° C. as a fixing resin, and a polyol having an SP value of 10 to 15.5 $(cal/cm^3)^{1/2}$ as a water-soluble organic solvent. This white ink composition is resistant to washing and rubbing, can exhibit high covering ability when it is used for a deep color cloth, and is highly stable in recording apparatuses. JP-A-2009-138077 discloses a white ink composition containing hollow resin particles as a white color material, and a polyurethane resin having a glass transition temperature of 50° C. or less as a fixing resin. This ink composition can produce white images having high rub fastness. JP-A-2009-138078 discloses a white ink composition containing hollow resin particles as a white color material and resin particles of another type having a larger average particle size than the hollow resin particles. This ink composition can produce white images having high rub fastness. JP-A-2006-96933 discloses an ink jet ink comprising a pigment, and two polymer compounds as a fixing resin for fixing the pigment: an amphiphilic polymer compound; and a polymer compound having a glass transition temperature of −30 to 60° C. According to this patent document, characters and images formed on various recording media with the ink jet ink are resistant to water, abrasion and bleeding, and the ink has a high ejection stability. The performance of the white ink composition and the quality of images formed with the ink composition depend significantly on the type and amount of the fixing resin.

If a urethane resin is used as a fixing resin, the recorded image exhibits high covering ability and high adhesion to the recording medium. However, the surface of the image is sticky, and the image is likely to adhere to other images when recording media are stacked on top of one another. Also, the use of a urethane resin as a fixing resin can enhance the covering ability of the image, but the rub fastness and water fastness are insufficient.

SUMMARY

Accordingly, an advantage of some aspects of the invention is that it provides a white ink composition that can form images having higher rub fastness and water fastness than ever with a high covering ability maintained, without causing the surface of the images to be sticky.

Another advantage is that it provides a white ink composition that can reduce the stickiness of the surface of the recorded image and can form images having much higher rub fastness and water fastness than ever.

The following embodiments can solve at least some of the issues described above.

A white ink composition according to an aspect of the invention contains a white pigment and fixing resins. The fixing resins include a vinyl chloride resin or a urethane resin, a fluorene resin, and a polyolefin wax.

In the white ink composition, the mass ratio of the vinyl chloride resin to the fluorene resin may be 5:1 to 1:6.

When the white ink composition contains the vinyl chloride resin, the mass ratio of the polyolefin wax to the fluorene resin may be 3:2 to 1:5.

The vinyl chloride resin content may be in the range of 0.5% to 10% by mass.

The mass ratio of the urethane resin to the fluorene resin may be 2:1 to 1:4.

When the white ink composition contains the urethane resin, the mass ratio of the polyolefin wax to the fluorene resin may be 2:1 to 1:5.

The urethane resin content may be in the range of 0.5% to 10% by mass.

The urethane resin may have an average particle size in the range of 100 to 200 nm.

The polyolefin wax may have an average particle size in the range of 30 to 700 nm.

A recorded material according to another aspect of the invention includes an image recorded with the above white ink composition.

DESCRIPTION OF EXEMPLARY EMBODIMENTS

Preferred embodiments of the invention will now be described. The embodiments disclosed below are described as examples of the invention. The invention is not limited to the disclosed embodiments, and various modifications may be made within the scope and spirit of the invention.

First Embodiment

1. White Ink Composition

The white ink composition of a first embodiment contains a white pigment and fixing resins for fixing the white pigment. The constituents in the white ink composition will now be described in detail.

1. 1. White Pigment

The white ink composition of the present embodiment contains a white pigment. Exemplary white pigments include metal oxides, barium sulfate, and calcium carbonate. Metal oxides include titanium dioxide, zinc oxide, silica, alumina, and magnesium oxide. Among these, titanium dioxide is preferred from the viewpoint of whiteness and rub fastness.

Preferably, the white pigment content in the white ink composition is 1% to 20% by mass, more preferably 5% to 15% by mass. If the white pigment content exceeds the above range, the ink composition may, for example, clog the ink jet recording head and thus degrade the reliability. In contrast, if the white pigment content is less than the above range, the whiteness or color density tends to be insufficient.

Preferably, the white pigment has an average particle size in the range of 30 to 600 nm, and more preferably in the range of 200 to 400 nm. If the average particle size exceeds the above range, the particles of the white pigment may sediment and lead to the degradation of the dispersion stability, or may clog the ink jet recording head to degrade the reliability. In contrast, if the average particle size is less than the above range, the whiteness tends to be insufficient.

The average particle size mentioned herein refers to the $d_{50}$ value in the particle size accumulation curve. The particle size accumulation curve is prepared by statistical processing of measurements of the diameter and number of particles dispersed in a liquid such as an ink composition. In the particle size accumulation curve, the horizontal axis represents the diameter of particles, and the vertical axis represents the integrated value of the mass of the particles (the product of the volume, density and number of the particles when they are assumed to be spheres) from smaller particles to larger particles. Particle size $d_{50}$ refers to the value on the horizontal axis of the particle size accumulation curve, that is, the diameter of particles, at 50% (0.50) on the vertical axis when the value of the vertical axis is normalized (when the total mass of the measured particles is 1).

The average particle size of the white pigment can be measured with a particle size distribution analyzer using a laser diffraction/scattering method. A particle size distribution meter using dynamic light scattering (for example, Microtrack UPA manufactured by Nikkiso Co., Ltd.) may be used as the particle size distribution analyzer.

1. 2. Fixing Resin

The white ink composition of the present embodiment further contains fixing resins to fix the white pigment to the recording medium. The white ink composition of the present embodiment contains a vinyl chloride resin, a fluorene resin and polyolefin wax, as the fixing resin.

1. 2. 1. Vinyl Chloride Resin

The vinyl chloride resin added as a fixing resin enhances the adhesion of the white ink composition to the recording medium and the water fastness of the recorded image, maintaining the covering ability of the image.

Vinyl chloride resins include vinyl chloride homopolymers and copolymers of vinyl chloride and other monomers. Preferably, the vinyl chloride resin is vinyl chloride-acrylic copolymer.

The vinyl chloride resin may be in the form of an emulsion, in which resin particles are dispersed in a solvent, or in the form of a solution, in which the resin is dissolved in a solvent. Preferably, an emulsion type is used. Resin emulsions are classified into a forced emulsification type and a self-emulsification type depending on the emulsification method. Either type can be used in the present embodiment.

Examples of the vinyl chloride resin emulsion include Vinyblan 278 and Vinyblan 271, each produced by Nissin Chemical Industry.

The vinyl chloride resin can be produced by a known method. For example, emulsion polymerization may be applied in which vinyl chloride and an acrylic monomer are dispersed and emulsified in water to prepare an emulsion, and a water-soluble polymerization initiator such as a persulfate is added to the emulsion. Other additives may be added as needed, such as a surfactant, a stabilizer, and a pH adjuster.

In the present embodiment, the vinyl chloride resin preferably has a minimum film forming temperature (MFT) of 0° C. or more, more preferably 30° C. or more. The MFT refers to the boundary temperature between the temperature at which white powder is precipitated and the temperature at which a transparent film is formed, when a dispersion of polymer in water with a solid content of 25% is applied to form a coating and the coating is dried by heating so as to have a temperature gradient. For measuring the MFT, a liquid composition of 30° C. or more is applied to form a coating, and the temperature at the surface of the coating is measured during drying.

Preferably, the vinyl resin content (solid content) in the white ink composition is 0.5% to 10% by mass, more preferably 0.5% to 5% by mass. If the vinyl chloride resin content exceeds the above range, the reliability of the ink (anti-clogging property, ejection stability, etc.) may be degraded, and suitable properties (for example, viscosity) may not be obtained. Furthermore, the rub fastness of the recorded image may be degraded. In contrast, if the vinyl resin content is less than the above range, the white ink composition is inferior in fixability (adhesion between the recording medium and the image) to the recording medium and in whiteness.

1. 2. 2. Fluorene Resin

In the white ink composition of the present embodiment, the fluorene resin added as a fixing resin enhances the rub fastness and water fastness of the recorded image.

The fluorene resin is not particularly limited as long as it has a fluorene skeleton. For example, it may be produced by copolymerization of the following monomer units (a) to (d):

(a) Isophorone diisocyanate (CAS No. 4098-71-9);
(b) 4,4'-(9-Fluorenylidene)bis[2-(phenoxy)ethanol] (CAS No. 117344-32-8);
(c) 3-Hydroxy-2-(hydroxymethyl)-2-methylpropionic acid (CAS No. 4767-03-7); and
(d) Triethylamine (CAS No. 121-44-8)

The fluorene resin used in the present embodiment contains a monomer having a fluorene skeleton like 4,4'-(9-fluorenylidene)bis[2-(phenoxy)ethanol](CAS No. 117344-32-8).

The fluorene resin (solid) content in the white ink composition is preferably in the range of 0.2% to 30% by mass, more preferably in the range of 0.5% to 10% by mass, and particularly preferably in the range of 2% to 6% by mass. If the fluorene resin content exceeds the above range, the covering ability of the recorded image is likely to be reduced and the image can be cracked. In contrast, if the fluorene resin content is less than the above range, the white ink composition may not form an image having high rub fastness and high water fastness.

In the white ink composition, preferably, the mass ratio of the vinyl chloride resin to the fluorene resin is 5:1 to 1:6. By compounding a vinyl chloride resin and a fluorene resin in the above ratio, the white ink composition can form a high-quality image superior in whiteness, rub fastness and water fastness, and adhesion to the recording medium without reducing the covering ability of the image. If the ratio of the vinyl chloride resin content exceeds the above range, the reliability of the ink (anti-clogging property, ejection stability, etc.) may be degraded, and suitable properties (for example, viscosity) may not be obtained. The water fastness of the recorded image may be degraded. In contrast, if the proportion of the fluorene resin content is excessively high beyond the above ratio, the covering ability of the recorded image is likely to be reduced and the image can be cracked.

1. 2. 3. Polyolefin Wax

In the white ink composition of the present embodiment, the polyolefin wax added as a fixing resin enhances the covering ability of the image and prevents the image from cracking. Since the white ink composition of the present embodiment contains a fluorene resin, as described above, the image can be cracked. The addition of a polyolefin wax can prevent the image from cracking effectively.

The polyolefin wax is not particularly limited and may be a wax or its copolymer produced from ethylene, propylene, butylene or any other olefin or an olefin derivative. More specifically, examples of the polyolefin wax include polyethylene waxes, polypropylene waxes and polybutylene waxes. Among these, polyethylene waxes are preferred from the viewpoint of preventing the image from cracking effectively. These polyethylene waxes may be used singly or in combination.

Commercially available polyolefin waxes may be used. Such polyolefin waxes include the CHEMIPEARL series, such as CHEMIPEARL W4005 (polyethylene wax produced by Mitsui Chemicals, particle size: 200 to 800 nm, softening point (measured by ring-and-ball method): 110° C., penetration hardness of 3, solid content: 40%); the AQUACER series produced by BYK, such as AQUACER 513 (polyethylene wax, particle size: 100 to 200 nm, melting point: 130° C., solid content: 30%), AQUACER 507, AQUACER515 and AQUACER 840; the Hitec series produced by TOHO Chemical Industry, such as Hitec E-7025P, Hitec E-2213, Hitec E-9460, Hitec E-9015, Hitec E-4A, Hitec E-5403P, and Hitec E-8237; and Nopcoat PEM-17 (polyethylene emulsion produced by San Nopco, particle size: 30 nm). These polyolefin waxes are commercially available in a form of aqueous emulsion in which a polyolefin wax has been dispersed in water by a conventional method. In the present embodiment, the aqueous emulsion of the polyolefin wax can be directly added as it is to the white ink composition.

The average particle size of the polyolefin wax is preferably in the range of 30 to 700 nm, and more preferably in the range of 200 to 700 nm. Polyolefin waxes having an average particle size in the range of 30 to 700 nm can reduce the occurrence of cracks in the image. In addition, if the average particle size is in the range of 200 to 700 nm, the image can be further prevented from cracking.

The average particle size of the polyolefin wax can be measured with a particle size distribution analyzer based on a laser diffraction/scattering method. A particle size distribution meter using dynamic light scattering (for example, Microtrack UPA manufactured by Nikkiso Co., Ltd.) may be used as the particle size distribution analyzer.

The polyolefin wax (solid) content in the white ink composition is preferably in the range of 0.2% to 30% by mass, more preferably in the range of 0.5% to 10% by mass, and particularly preferably in the range of 1% to 3% by mass. If the polyolefin wax content exceeds the above range, the whiteness of the recorded image may be reduced. In contrast, if it is less than the above range, the image is unlikely to be prevented from cracking.

In the white ink composition, preferably, the mass ratio of the polyolefin wax to the fluorene resin is 3:2 to 1:5, and more preferably 3:2 to 1:3. For the white ink composition, a polyolefin wax and a fluorene resin are compounded in the above ratio, so that high-quality images can be recorded which are superior in whiteness, covering ability, rub fastness and water fastness and are prevented from cracking. If the proportion of the polyolefin wax content is excessively high beyond the above ratio, the whiteness of the image may be reduced. In contrast, if the proportion of the fluorene resin content is excessively high beyond the above ratio, the covering ability of the recorded image is likely to be reduced and the image may be cracked.

1. 3. Other Constituents

The white ink composition of the present embodiment may further contain at least one of alkanediols and glycol ethers. Alkanediols and glycol ethers can increase the wettability to the recording surface of the recording medium and thus enhance the penetration of the ink.

Preferred alkanediols include 1,2-alkanediols having a carbon number in the range of 4 to 8, such as 1,2-butanediol, 1,2-pentanediol, 1,2-hexanediol, 1,2-heptanediol, and 1,2-octanediol. More preferably, 1,2-alkanediols having a carbon number of 6 to 8 are used, such as 1,2-hexanediol, 1,2-heptanediol, and 1,2-octanediol. These alkanediols can particularly easily penetrate the recording medium.

Exemplary glycol ethers include lower alkyl ethers of polyhydric alcohols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropylene glycol monomethyl ether. In particular, triethylene glycol monobutyl ether can provide a higher recording quality.

Preferably, the total content of the alkanediols and glycol ethers in the white ink composition is 1% to 20% by mass, and more preferably 1% to 10% by mass.

In addition to the above constituents, the white ink composition of the present embodiment may contain an acetylene glycol-based surfactant or a polysiloxane-based surfactant. Acetylene glycol-based and polysiloxane-based surfactants can increase the wettability to the recording surface of the recording medium to enhance the penetration of the ink composition.

Exemplary acetylene glycol-based surfactants include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. A commercially available acetylene glycol-based surfactant may be used, such as OLFIN E1010, OLFIN STG and OLFIN Y (each produced by Nissin Chemical Industry); and SURFYNOLs 104, 82, 465, 485, and TG (each produced by Air Products and Chemicals Inc.).

The polysiloxane-based surfactant may also be a commercially available product, such as BYK-347 or BYK-348 (each produced by BYK).

Another surfactant may be further added, such as an anionic surfactant, a nonionic surfactant, or an amphoteric surfactant.

Preferably, the surfactant content in the white ink composition is 0.01% to 5% by mass, more preferably 0.1% to 0.5% by mass.

In addition to the above constituents, the white ink composition of the present embodiment may contain a polyhydric alcohol. Polyhydric alcohols can prevent the ink from drying and clogging the ink jet recording head portion.

Exemplary polyhydric alcohols include ethylene glycol, diethylene glycol, triethylene glycol, polyethylene glycol, polypropylene glycol, propylene glycol, butylene glycol, 1,2, 6-hexanetriol, thioglycol, hexylene glycol, glycerin, trimethylolethane, and trimethylolpropane.

The polyhydric alcohol content in the white ink composition is preferably 0.1% to 30% by mass, more preferably 0.5% to 20% by mass.

The white ink composition of the present embodiment contains water as a solvent. Preferably, the water is pure water or ultrapure water, such as ion exchanged water, ultrafiltered water, reverse osmotic water, or distilled water. Preferably, the water is sterilized by irradiation with UV light or by adding hydrogen peroxide. Such water prevents occurrence of mold and bacteria over the long term.

The white ink composition of the present embodiment may further contain an organic solvent as an additional solvent. Examples of the organic solvent include alkyl alcohols having a carbon number in the range of 1 to 4, such as ethanol, methanol, butanol, propanol, and isopropanol, 2-pyrrolidone, formamide, acetamide, dimethylsulfoxide, sorbitol, sorbitan, acetin, diacetin, triacetin, and sulfolane. These organic solvents can enhance the penetration of the ink composition to the recording medium and also prevent the clogging of nozzles. These organic solvents may be used singly or in combination, and the total content in the white ink composition is preferably about 0.1% to 10% by mass.

The white ink composition of the present embodiment can be prepared in the same manner as known pigment inks, using a known apparatus, such as ball mill, sand mill, attritor, basket mill or roll mill. For the preparation, it is preferable that coarse particles be removed through a membrane filter, a mesh filter or the like.

The white ink composition can form white images by being applied onto a variety of recording media. Exemplary recording media include paper, cardboard, textile, sheet and film, plastics, glass, and ceramics.

The white ink composition can be used for any application without particular limitation, and can be used for a variety of ink jet recording methods. Ink jet recording methods include a thermal ink jet method, a piezoelectric ink jet method, a continuous ink jet method, roller application, and spray application.

2. Recorded Material

An embodiment of the invention can provide a recorded material in which an image has been formed with the above-described white ink composition. In the recorded material, the image is not sticky, and its rub fastness and water fastness are markedly increased while the covering ability is maintained. Thus, a high-quality white recorded material can be produced. The recorded material of an embodiment of the invention is also superior in whiteness and adhesion, and exhibits good balance in quality, preventing bleeding with color inks and cracks in the image.

Second Embodiment

1. White Ink Composition

The white ink composition of a second embodiment contains a white pigment and fixing resins for fixing the white pigment. The fixing resins include a urethane resin, a fluorene resin, and a polyolefin wax.

1. 1. White Pigment

The white ink composition of the present embodiment contains a white pigment. The same white pigment as used in the first embodiment can be used.

1. 2. Fixing Resin

The white ink composition of the present embodiment further contains fixing resins to fix the white pigment to the recording medium. The white ink composition of the present embodiment contains a urethane resin, a fluorene resin and polyolefin wax, as the fixing resin.

1. 2 1. Urethane Resin

In the white ink composition of the present embodiment, the urethane resin added as a fixing resin enhances the covering ability of the record image and the adhesion to the recorded image.

The urethane resin may be in a form of emulsion, in which resin particles are dispersed in a solvent, or in a form of solution, in which the resin is dissolved in a solvent. Preferably, an emulsion type is used. Resin emulsions are classified into a forced emulsification type and a self-emulsification type depending on the emulsification method. Either type can be used in the present embodiment.

Examples of the urethane resin include W-6061, W-605, W-635 and WS-6021 (each produced by Mitsui Chemical Polyurethanes), and WBR-016U (produced by Taisei Fine Chemical).

Such a urethane resin can be produced by a known method. For example, polyisocyanate, polyol and a chain extending agent may be allowed to react with each other in the presence or absence of a catalyst.

If a urethane resin emulsion is used, the average particle size of the urethane resin is preferably in the range of 30 to 200 nm, more preferably in the range of 50 to 200 nm, and particularly preferably in the range of 100 to 200 nm. Urethane resins having an average particle size in the above range can be uniformly dispersed in the white ink composition. Also, from the viewpoint of enhancing the rub fastness, the average particle size is preferably 100 nm or more.

The average particle size of the urethane resin can be measured with a particle size distribution analyzer based on a laser diffraction/scattering method. A particle size distribution meter using dynamic light scattering (for example, Microtrack UPA manufactured by Nikkiso Co., Ltd.) may be used as the particle size distribution analyzer.

Preferably, the urethane resin content (solid content) in the white ink composition is 0.5% to 10% by mass, more preferably 0.5% to 5% by mass. If the urethane resin content exceeds the above range, the reliability of the ink (anti-clogging property, ejection stability, etc.) may be degraded, and suitable properties (for example, viscosity) may not be obtained. Also, the stickiness of the recorded image may not be reduced. In contrast, if the urethane resin content is less than the above range, the white ink composition is inferior in fixability on the recording medium and accordingly cannot form images having high rub fastness. The images are also inferior in whiteness.

1. 2. 2. Fluorene Resin

In the white ink composition of the present embodiment, the fluorene resin added as a fixing resin enhances the rub fastness and water fastness of the recorded image. Although the urethane resin added to the white ink composition may increase the stickiness of the recorded image, the increase in stickiness may be prevented by adding a fluorene resin with the urethane resin.

The same fluorene resin as used in the first embodiment can be used.

The fluorene resin (solid) content in the white ink composition is preferably in the range of 0.25% to 30% by mass, more preferably in the range of 0.5% to 6% by mass, and particularly preferably in the range of 1% to 3% by mass. If the fluorene resin content exceeds the above range, the covering ability of the recorded image is likely to be reduced and the image may be cracked. In contrast, if the fluorene resin content is less than the above range, the white ink composition may not form an image having high rub fastness and high water fastness. Also, the stickiness of the recorded image may not be reduced.

In the white ink composition, the mass ratio of the urethane resin to the fluorene resin is preferably in the range of 2:1 to 1:4, and more preferably in the range of 2:1 to 1:3. By compounding a urethane resin and a fluorene resin in the above ratio, the white ink composition can prevent the stickiness of the recorded image, and can form high-quality images superior in whiteness, covering ability, rub fastness and water fastness, and adhesion to the recording medium. If the proportion of the urethane resin content is excessively high beyond the above ratio, it is likely to make the surface rough and thus to cause defectiveness at the image surface. In addition, the water fastness of the image may be reduced. In contrast, if the proportion of the fluorene resin content is excessively high beyond the above ratio, the covering ability of the recorded image is likely to be reduced and the image may be cracked.

1. 2. 3. Polyolefin Wax

In the white ink composition of the present embodiment, the polyolefin wax added as a fixing resin enhances the covering ability of the image and prevents the image from cracking. Since the white ink composition of the present embodiment contains a fluorene resin, as described above, the image can be cracked. The addition of a polyolefin wax can prevent the image from cracking effectively.

The same polyolefin wax as used in the first embodiment can be used.

The polyolefin wax (solid) content in the white ink composition is preferably in the range of 0.25% to 30% by mass, more preferably in the range of 0.5% to 6% by mass, and particularly preferably in the range of 1% to 3% by mass. If the polyolefin wax content exceeds the above range, the whiteness of the recorded image may be reduced. In contrast, if it is less than the above range, the image is unlikely to be prevented from cracking.

In the white ink composition, preferably, the mass ratio of the polyolefin wax to the fluorene resin is in the range of 2:1 to 1:5, more preferably in the range of 2:1 to 1:3, and particularly preferably in the range of 2:1 to 1:1. For the white ink composition, a polyolefin wax and a fluorene resin are compounded in the above ratio, so that high-quality images can be recorded which are superior in whiteness, covering ability, rub fastness and water fastness and are prevented from cracking. If the proportion of the polyolefin wax content is excessively high beyond the above ratio, the whiteness of the image may be reduced. In contrast, if the proportion of the fluorene resin content is excessively high beyond the above ratio, the covering ability of the recorded image is likely to be reduced and the image may be cracked.

1. 3. Other Constituents

The white ink composition of the present embodiment may further contain at least one of alkanediols and glycol ethers. Alkanediols and glycol ethers can increase the wettability to the recording surface of the recording medium to enhance the penetration of the ink.

In addition to the above constituents, the white ink composition of the present embodiment may contain an acetylene glycol-based surfactant or a polysiloxane-based surfactant. Acetylene glycol-based and polysiloxane-based surfactants can increase the wettability to the recording surface of the recording medium to enhance the penetration of the ink composition.

Another surfactant may be further added, such as an anionic surfactant, a nonionic surfactant, or an amphoteric surfactant.

In addition to the above constituents, the white ink composition of the present embodiment may contain a polyhydric alcohol. Polyhydric alcohols can prevent the ink from drying and clogging the ink jet recording head portion.

The white ink composition of the present embodiment contains water as a solvent.

The white ink composition of the present embodiment may further contain organic solvent as an additional solvent. The same solvent as used in the first embodiment can be used.

The white ink composition of the present embodiment can be prepared in the same manner as known pigment inks, using a known apparatus, such as ball mill, sand mill, attritor, basket mill or roll mill. For the preparation, it is preferable that coarse particles be removed through a membrane filter, a mesh filter or the like.

The white ink composition can form white images by being applied onto a variety of recording media. Exemplary recording media include paper, cardboard, textile, sheet and film, plastics, glass, and ceramics.

The white ink composition can be used for any application without particular limitation, and can be used for a variety of ink jet recording methods. Ink jet recording methods include thermal ink jet method, piezoelectric ink jet method, continuous ink jet method, roller application, and spray application.

2. Recorded Material

An embodiment of the invention can provide a recorded material in which an image has been formed with the above-described white ink composition. In the recorded material, the stickiness of the recorded image is reduced, and the rub fastness and water fastness of the image are remarkably increased. Thus, a high-quality white recorded material can be produced. The recorded material of an embodiment of the invention is also superior in whiteness, covering ability and adhesion, and exhibits good balance in quality, preventing bleeding with color inks and cracks in the image.

EXAMPLES

The invention will be described in detail with reference to Examples. However, it is not limited to the Examples.

Example A

1. Preparation of White Ink Composition

According to the compositions shown in Tables 1 and 2, titanium dioxide particles, fixing resins, an organic solvent, a polyhydric alcohol, a surfactant and ion exchanged water were mixed by stirring, and the mixture was filtered through a metal filter of 5 μm in pore size. The filtrate was deaerated with a vacuum pump. Thus, white ink compositions of Samples A1 to A19 were prepared. The values of the constituents of Samples A1 to A19 shown in Tables 1 and 2 represent their contents on the percent by mass basis. The contents of titanium dioxide particles, vinyl chloride resins, fluorene resin and polyethylene wax are shown in terms of solid.

Commercially available NanoTek® Slurry (produced by C. I. Kasei) was used as titanium dioxide particles. NanoTek® Slurry contains 15% of titanium dioxide having an average particle size of 300 nm as a solid content.

A polysiloxane-based surfactant BYK-348 (produced by BYK) was used as a surfactant.

The fixing resins shown in Tables 1 and 2 are as follows:
vinyl chloride resin A (Vinyblan 278, produced by Nissin Chemical Industry, solid content: 45%, MFT: 50° C.)
vinyl chloride resin B (Vinyblan 271, produced by Nissin Chemical Industry, solid content: 45%, MFT: 0° C.)
Polyethylene wax A (AQ513, produced by BYK, average particle size: 100 to 200 nm)
Polyethylene wax B (W4005, produced by Mitsui Chemicals, average particle size: 200 to 700 nm)
Polyethylene wax C (Nopcoat PEM-17, produced by San Nopco, average particle size: 30 nm)

The fluorene resin shown in Tables 1 and 2 was synthesized by Sufficiently mixing 30 parts by mass of isophorone diisocyanate, 50 parts by mass of 4,4'-(9-fluorenylidene)bis[2-(phenoxy)ethanol], 100 parts by mass of 3-hydroxy-2-(hydroxymethyl)-2-methylpropionic acid, and 30 parts by mass of triethylamine, and stirring the mixture at 120° C. in the presence of a catalyst for 5 hours. The resulting fluorene resin had a molecular weight of 3300 and contained 4,4'-(9-fluorenylidene)bis[2-(phenoxy)ethanol] in a monomer ratio of about 50% by mass.

2. Evaluation of Recorded Material

The black ink chamber of the cartridge of an ink jet printer (PX-G930 manufactured by Seiko Epson) was filled with any one of the white ink compositions shown in Tables 1 and 2. The ink cartridge was loaded in the printer, and printing tests were performed. Commercially available ink cartridges were used as ink cartridges other than the black ink cartridge. These were intended for dummies, and were not involved in the evaluation.

Subsequently, printing was performed on a commercially available PET sheet, Lumirror® S10-100 μm (manufactured by Toray, not having an ink receiving layer) at a resolution of 1440 dpi by 720 dpi. The printed pattern was a 100% duty-solid pattern. The duty mentioned herein is calculated from the following equation:

$$\text{Duty}(\%) = \text{number of printed dots}/(\text{vertical resolution} \times \text{horizontal resolution}) \times 100$$

(In the equation, the number of printed dots refers to the number of dots actually printed per unit area, and the vertical resolution and the horizontal resolution each refer to a resolution per unit length. A duty of 100% refers to the maximum mass of a single color ink for a pixel.)

The recorded materials prepared in the above process were subjected to the following tests for evaluation.

2. 1. Whiteness

The whiteness of each recorded material was determined by measuring the L* value in the CIE/L*a*b* color system with a colorimeter using a black substrate, such as Gretag Macbeth Spectroscan and Spectrolino (manufactured by X-Rite). The evaluation criteria were as follows:
20 points: 75≤L*
15 points: 73≤L*<75
10 points: 70≤L*<73
5 points: L*<70

2. 2. Covering Ability

Each recorded material was set in a multi-angle colorimeter ARM-500V (manufactured by JASCO Corporation), and transmittances Tn (%) of light rays having wavelengths in the visible light region (380 to 700 nm) through the recorded material were measured by the nanometer. The covering ability was evaluated by calculating the integrated value of the transmittance Tn of each wavelength in the visible light region (380 to 700 nm) from the measurement results. In this evaluation, the integrated value lies in the range of 0 to 32000. When light is completely blocked, the integrated value is 0, and when light is completely transmitted, the integrated value is 32000. The evaluation criteria were as follows:
20 points: Integrated Tn<120
15 points: 120≤integrated Tn<150
10 points: 150≤integrated Tn<200
5 points: 200≤integrated Tn 2. 3. Surface State Subsequently, the surface state of each recorded material was evaluated. The surface state was evaluation by touching the surface of the recorded material, and determined according to the following criteria.
10 points: Recorded material surface was not sticky
5 points: Recorded material surface was slightly sticky
−20 points: Recorded material surface was sticky 2. 4. Rub Fastness The rub fastness was determined by rubbing the PET sheet on which an image had been recorded with the white ink composition and dried at 50° C. in a thermostat for 10 minutes. The rubbing with cloth was performed by reciprocally rubbing the print surface with cloth two or three times. The evaluation criteria were as follows:
10 points: Abrasion was not caused at the print surface even by rubbing with cloth.
5 points: Abrasion was slightly caused at the print surface by rubbing with cloth.
−20 points: Distinct abrasion was caused at the print surface by rubbing with cloth.

2. 5. Water Fastness

The water fastness was evaluated by rubbing the PET sheet on which an image had been recorded with the white ink composition and dried at 50° C. for 10 minutes in a thermostat. In this instance, the cloth was fully impregnated with water. The rubbing with cloth was performed by reciprocally rubbing the print surface with cloth two or three times. The evaluation criteria were as follows:
10 points: The print surface was not peeled by rubbing with cloth.
5 points: The print surface was slightly peeled by rubbing with cloth.
−20 points: The print surface was completely peeled by rubbing with cloth.

2. 6. Adhesion

The adhesion was evaluated by scratching with a nail the PET sheet on which an image had been recorded and dried at 50° C. for 10 minutes in a thermostat. The scratching with a nail was performed by reciprocally scratching the print surface with a nail two or three times. The evaluation criteria were as follows:
10 points: Not peeled even by scratching.
5 points: Slightly peeled by scratching.
−20 points: Completely peeled by scratching.

2. 7. Bleeding (1) Recording Method

A 100% duty white solid pattern was printed with each white ink composition on a recording medium (Lumirror® S10-100 μm, manufactured by Toray) having a recording surface made of a plastic film at a resolution of 1440 dpi by 720 dpi, using an ink jet printer (PX-G930, manufactured by Seiko Epson) charged with C, M, Y, K, and white inks while the sheet feeder was being heated to 70° C. with a drier so that the recording medium during printing would come to 45° C. Immediately after this operation, a 10% to 100% duty pattern in which two colors came in contact with each other was printed on the white solid pattern at a resolution of 1440 dpi by×720 dpi.

(2) Evaluation

Whether or not the bleeding of the two colors occurred in the printed pattern was observed for each duty, and the evaluation was made according to the following criteria.
10 points: Bleeding did not occur even in 100% duty pattern.
5 points: Bleeding did not occur in patterns with a duty of 70% or less.
0 points: Bleeding did not occur in patterns with a duty of 40% or less.
−20 points: Bleeding occurred in patterns with a duty of less than 40%.

2. 8. Reliability

For the evaluation of the reliability, it was checked whether the head portion of the ink jet printer was easy to clog after forming a white recorded material, and whether the clogging could be eliminated by cleaning, after the white recorded material was formed. The evaluation criteria were as follows:

10 points: Clogging did not occur easily, and the clogging was eliminated easily by cleaning.
0 points: Clogging did not easily occur, but was difficult to eliminate by cleaning.
0 points: Clogging easily occurred, but was easy to eliminate by cleaning.
−20 points: Clogging easily occurred, and was difficult to eliminate by cleaning.

2. 9. Cracks

For evaluation in view of cracks, the PET sheet on which an image had been recorded with the white ink composition was dried in a thermostat for 10 minutes and visually observed. The evaluation criteria were as follows:

0 points: Not cracked after drying.
−20 points: Cracked after drying.

2. 10. Comprehensive Evaluation

The quality of each white ink composition was comprehensively evaluated from the total point of the above evaluations. If the total point is 60 or more, the white ink composition can be used without any difficulty. If the total point is 70 or more, it can be considered to be particularly superior in quality. If the total point is less than 60, one or some of the evaluation results of the ink composition are not good, and the ink composition is considered to be unacceptable as a product.

3. Evaluation Results

Evaluation results are shown together in Tables 1 and 2.

TABLE 1

|  | Sample A1 | Sample A2 | Sample A3 | Sample A4 | Sample A5 | Sample A6 | Sample A7 | Sample A8 | Sample A9 | Sample A10 |
|---|---|---|---|---|---|---|---|---|---|---|
| Titanium dioxide particles | 10 | 10 | 10 | 10 | 10 | 10 | 10 | 10 | 10 | 10 |
| Vinyl chloride resin A | 6 | 4 | 3 | 2 |  | 4 | 4 | 4 | 1.5 | 2 |
| Vinyl chloride resin B |  |  |  |  | 4 |  |  |  |  |  |
| Fluorene resin | 2 | 2 | 3 | 6 | 2 | 2 | 2 | 2 | 4.5 | 10 |
| Polyethylene wax A |  |  |  |  |  | 2 |  |  |  |  |
| Polyethylene wax B | 2 | 2 | 2 | 2 | 2 |  |  | 3 | 1 | 2 |
| Polyethylene wax C |  |  |  |  |  |  | 2 |  |  |  |
| Surfactant | 1 | 1 | 1 | 1 | 1 | 1 | 1 | 1 | 1 | 1 |
| Propylene glycol | 2 | 2 | 2 | 2 | 2 | 2 | 2 | 2 | 2 | 2 |
| 1,2-Hexanediol | 5 | 5 | 5 | 5 | 5 | 5 | 5 | 5 | 5 | 5 |
| 2-Pyrrolidone | 2 | 2 | 2 | 2 | 2 | 2 | 2 | 2 | 2 | 2 |
| Ion exchanged water | Balance | Balance | Balance | Balance | Balance | Balance | Balance | Balance | Balance | Balance |
| Vinyl chloride resin:fluorene resin | 3:1 | 2:1 | 1:1 | 1:3 | 2:1 | 2:1 | 2:1 | 2:1 | 1:3 | 1:5 |
| Polyolefin wax:fluorene resin | 1:1 | 1:1 | 2:3 | 1:3 | 1:1 | 1:1 | 1:1 | 3:2 | 2:9 | 1:5 |
| Whiteness (L* value) | 20 | 20 | 15 | 15 | 20 | 20 | 20 | 20 | 15 | 15 |
| Covering ability | 20 | 20 | 15 | 10 | 2 | 20 | 20 | 10 | 10 | 10 |
| Surface state | 10 | 10 | 10 | 10 | 10 | 10 | 10 | 10 | 10 | 10 |
| Rub fastness | 10 | 10 | 10 | 10 | 10 | 5 | 5 | 10 | 10 | 10 |
| Water fastness | 10 | 10 | 10 | 10 | 5 | 10 | 10 | 10 | 10 | 10 |
| Adhesion | 10 | 10 | 10 | 10 | 10 | 10 | 10 | 10 | 10 | 5 |
| Bleeding | 10 | 10 | 10 | 10 | 10 | 10 | 10 | 10 | 10 | 10 |
| Reliability | 0 | 0 | 0 | 0 | 0 | 0 | 0 | 0 | 0 | 0 |
| Crack | 0 | 0 | 0 | 0 | 0 | 0 | 0 | 0 | 0 | 0 |
| Total point | 90 | 90 | 80 | 75 | 85 | 85 | 85 | 80 | 75 | 70 |

TABLE 2

|  | Sample A11 | Sample A12 | Sample A13 | Sample A14 | Sample A15 | Sample A16 | Sample A17 | Sample A18 | Sample A19 |
|---|---|---|---|---|---|---|---|---|---|
| Titanium dioxide particles | 10 | 10 | 10 | 10 | 10 | 10 | 10 | 10 | 10 |
| Vinyl chloride resin A | 1 | 4 | 4 | 6 |  | 4 | 4 | 1 | 1 |
| Vinyl chloride resin B |  |  |  |  | 4 |  |  |  |  |
| Fluorene resin | 6 | 1 | 1 | 1 | 2 |  | 2 | 7 | 6 |
| Polyethylene wax A |  |  |  |  |  |  |  |  |  |
| Polyethylene wax B | 1 | 1 | 1 | 2 | 2 |  | 2 | 1 | 2 |
| Surfactant | 1 | 1 | 1 | 1 | 1 | 1 | 1 | 1 | 1 |
| Propylene glycol | 2 | 2 | 2 | 2 | 2 | 2 | 2 | 2 | 2 |
| 1,2-Hexanediol | 5 | 5 | 5 | 5 | 5 | 5 | 5 | 5 | 5 |
| 2-Pyrrolidone | 2 | 2 | 2 | 2 | 2 | 2 | 2 | 2 | 2 |
| Ion exchanged water | Balance | Balance | Balance | Balance | Balance | Balance | Balance | Balance | Balance |
| Vinyl chloride resin:fluorene resin | 1:6 | 4:1 | 5:1 | 6:1 | — | — | 2:1 | 1:7 | 1:6 |
| Polyolefin wax:fluorene resin | 1:3 | 1:1 | 1:1 | 1:1 | 1:1 | — | — | 2:7 | 1:6 |
| Whiteness (L* value) | 15 | 20 | 20 | 15 | 10 | 15 | 15 | 10 | 15 |
| Covering ability | 10 | 20 | 20 | 15 | 5 | 15 | 15 | 10 | 10 |
| Surface state | 10 | 10 | 10 | 10 | 10 | 10 | 10 | 10 | 10 |
| Rub fastness | 10 | 5 | 5 | 5 | 10 | −20 | 5 | 10 | 10 |
| Water fastness | 10 | 10 | 10 | 10 | 5 | 10 | 10 | 10 | 10 |
| Adhesion | 5 | 10 | 10 | 10 | −20 | 10 | 10 | 5 | 5 |

TABLE 2-continued

|  | Sample A11 | Sample A12 | Sample A13 | Sample A14 | Sample A15 | Sample A16 | Sample A17 | Sample A18 | Sample A19 |
|---|---|---|---|---|---|---|---|---|---|
| Bleeding | 10 | 10 | 10 | 10 | 10 | 10 | 10 | 10 | 10 |
| Reliability | 0 | 0 | −20 | −20 | 0 | 0 | 0 | −20 | 0 |
| Crack | 0 | 0 | 0 | 0 | 0 | 0 | −20 | 0 | −20 |
| Total point | 70 | 85 | 65 | 55 | 30 | 50 | 55 | 45 | 50 |

It was confirmed that any of the white ink compositions of Samples A1 to A13 shown in Tables 1 and 2 is superior in whiteness, rub fastness, adhesion, and water fastness, and can prevent the image from cracking without impairing the covering ability of the recorded image.

It was shown that the white ink composition of Sample A14 (vinyl chloride resin:fluorene resin=6:1) forms nonuniform images and, consequently, reduces the whiteness of the images, and that the reliability is thus significantly insufficient.

It was shown that the white ink composition of Sample A15 (containing no vinyl chloride resin) can significantly degrade the covering ability of the image and the adhesion to the recording medium.

It was shown that the white ink composition of Sample A16 (containing no fluorene resin) can significantly degrade the rub fastness of the recorded image.

It was shown that the white ink composition of Sample A17 (containing no polyolefin wax) can degrade the rub fastness of the recorded image and cause the image to crack.

It was shown that the white ink composition of Sample A18 (vinyl chloride resin:fluorene resin=1:7) forms nonuniform images and. Consequently, reduces the whiteness of the images, and that the reliability is thus insufficient.

It was shown that the white ink composition of Sample A19 (vinyl chloride resin:fluorene resin=1:6) causes the image to crack.

Example B

1. Preparation of White Ink Composition

According to the compositions shown in Table 3, titanium dioxide particles, fixing resins, an organic solvent, a polyhydric alcohol, a surfactant and ion exchanged water were mixed by stirring, and the mixture was filtered through a metal filter of 5 μm in pore size. The filtrate was deaerated with a vacuum pump. Thus, white ink compositions of Samples B1 to B15 were prepared. The values of the constituents of Samples B1 to B15 shown in Table 3 represent the contents of the constituents on the percent by mass basis. The contents of titanium dioxide particles, urethane resin, fluorene resin, styrene-acrylic resin, and polyethylene wax are shown in terms of solid.

The same titanium dioxide particles and surfactant as in Example A were used.

The fixing resins shown in Table 3 are as follows:

Urethane resin A (W-605, produced by Mitsui Chemical Polyurethanes, average particle size: 35 nm)

Urethane resin B (W-635, produce by Mitsui Chemical Polyurethanes, average particle size: 135 nm)

Styrene-acrylic resin (JONCRYL 62J, produced by BASF, aqueous solution, molecular weight: 8500)

Polyethylene wax A (AQ513, produced by BYK, average particle size: 100 to 200 nm)

Polyethylene wax B (W4005, Mitsui Chemicals, average particle size: 200 to 700 nm)

Polyethylene wax C (Nopcoat PEM-17, produced by San Nopco, average particle size: 30 nm)

The fluorene resin shown in Table 3 was synthesized in the same manner as in Example A.

2. Evaluation of Printed Material

The white ink compositions shown in Table 3 were evaluated in the same manner as in Example A. The quality of each white ink composition was comprehensively evaluated from the total point of evaluations. If the total point is 50 or more, the ink composition can be used without any difficulty. If the total point is 70 or more, it can be considered to be particularly superior in quality. If the total point is less than 50, one or some of the evaluation results of the ink composition are not good, and the ink composition is considered to be unacceptable as a product.

3. Evaluation Results

The results are shown together in Table 3.

TABLE 3

|  | Sample B1 | Sample B2 | Sample B3 | Sample B4 | Sample B5 | Sample B6 | Sample B7 | Sample B8 | Sample B9 | Sample B10 | Sample B11 | Sample B12 | Sample B13 | Sample B14 | Sample B15 |
|---|---|---|---|---|---|---|---|---|---|---|---|---|---|---|---|
| Titanium dioxide particles | 10 | 10 | 10 | 10 | 10 | 10 | 10 | 10 | 10 | 10 | 10 | 10 | 10 | 10 | 10 |
| Urethane resin A |  |  |  | 2 |  |  |  |  |  |  |  |  |  |  |  |
| Urethane resin B | 2 | 2 | 2 |  | 2 | 2 | 1 | 2 | 3 | 5 | 2 |  | 3 | 1 | 2 |
| Fluorene resin | 1 | 2 | 6 | 2 | 2 | 2 | 4 | 5 | 1 |  |  | 2 | 3 | 5 | 6 |
| Styrene-acrylic resin |  |  |  |  |  |  |  |  |  |  | 1 |  |  |  |  |
| Polyethylene wax A |  |  |  |  |  | 2 |  |  |  |  |  | 2 |  |  |  |

TABLE 3-continued

| | Sample B1 | Sample B2 | Sample B3 | Sample B4 | Sample B5 | Sample B6 | Sample B7 | Sample B8 | Sample B9 | Sample B10 | Sample B11 | Sample B12 | Sample B13 | Sample B14 | Sample B15 |
|---|---|---|---|---|---|---|---|---|---|---|---|---|---|---|---|
| Polyethylene wax B | 2 | 2 | 2 | 2 | | 2 | 1 | 2 | | 2 | | 2 | 1 | | |
| Polyethylene wax C | | | | | | 2 | | | | | | | | | |
| Surfactant | 1 | 1 | 1 | 1 | 1 | 1 | 1 | 1 | 1 | 1 | 1 | 1 | 1 | 1 | 1 |
| Propylene glycol | 2 | 2 | 2 | 2 | 2 | 2 | 2 | 2 | 2 | 2 | 2 | 2 | 2 | 5 | 5 |
| 1,2-Hexanediol | 5 | 5 | 5 | 5 | 5 | 5 | 5 | 5 | 5 | 5 | 5 | 5 | 5 | 5 | 5 |
| 2-Pyrrolidone | 2 | 2 | 2 | 2 | 2 | 2 | 2 | 2 | 2 | 2 | 2 | 2 | 2 | 2 | 2 |
| Ion exchanged water | Balance | Balance | Balance | Balance | Balance | Balance | Balance | Balance | Balance | Balance | Balance | Balance | Balance | Balance | Balance |
| Urethane resin:fluorene resin | 2:1 | 1:1 | 1:3 | 1:1 | 1:1 | 1:1 | 1:4 | 2:5 | 3:1 | — | — | — | 1:1 | 1:5 | 1:3 |
| Polyolefin wax:fluorene resin | 2:1 | 1:1 | 1:3 | 1:1 | 1:1 | 1:1 | 1:2 | 1:5 | 2:1 | — | — | 1:1 | — | 2:5 | 1:6 |
| Whiteness (L* value) | 20 | 20 | 15 | 15 | 20 | 20 | 15 | 15 | 20 | 20 | 20 | 15 | 15 | 10 | 15 |
| Covering ability | 20 | 15 | 10 | 15 | 15 | 15 | 5 | 5 | 20 | 15 | 20 | 5 | 20 | 5 | 10 |
| Surface state | 5 | 10 | 10 | 5 | 10 | 10 | 10 | 10 | −20 | 5 | −20 | 10 | 5 | 10 | 10 |
| Rub fastness | 5 | 10 | 10 | 5 | 5 | 5 | 10 | 10 | 5 | 5 | −20 | 10 | 5 | 10 | 10 |
| Water fastness | 5 | 5 | 10 | 5 | 5 | 5 | 10 | 10 | −20 | −20 | −20 | 10 | 5 | 10 | 10 |
| Adhesion | 5 | 5 | 5 | 5 | 5 | 5 | 5 | 5 | 5 | 5 | 5 | −20 | 5 | −20 | 5 |
| Bleeding | 10 | 10 | 10 | 10 | 10 | 10 | 10 | 10 | 10 | 10 | 10 | 10 | 10 | 10 | 10 |
| Reliability | 0 | 0 | 0 | 0 | 0 | 0 | 0 | 0 | 0 | 0 | 0 | 0 | 0 | 0 | 0 |
| Crack | 0 | 0 | 0 | 0 | 0 | 0 | 0 | 0 | 0 | 0 | 0 | 0 | −20 | 0 | −20 |
| Total point | 70 | 75 | 70 | 60 | 70 | 70 | 65 | 65 | 20 | 40 | −5 | 40 | 45 | 35 | 50 |

It was shown that any of the white ink compositions of Samples B1 to B8 shown in Table 3 has a good surface state (not sticky, or little sticky), is superior in whiteness, rub fastness, and water fastness, and can prevent the image from cracking.

On the other hand, it was shown that the white ink composition of Sample B9 (urethane resin:fluorene resin=3:1) forms an image having a sticky surface and significantly degrades the water fastness.

It was shown that the white ink composition of Sample B10 (containing styrene-acrylic resin instead of fluorene resin) significantly degrades the water fastness. These results show that fluorene resins are more effective than styrene-acrylic resins in enhancing the water fastness.

It was shown that the white ink composition of Sample B11 (containing no fluorene resin) forms an image having a sticky surface, and significantly degrades the rub fastness and water fastness of the recorded image.

It was shown that the white ink composition of Sample B12 (containing no urethane resin) degrades the covering ability of the recorded image, and that the adhesion to the recording medium is inferior.

It was shown that the white ink composition of Sample B13 (containing no polyolefin wax) can enhance the covering ability of the image, but causes the image to crack.

It was shown that the white ink composition of Sample B14 (urethane resin:fluorene resin=1:5) degrades the covering ability of the recorded image, and that the adhesion to the recording medium is inferior.

It was shown that the white ink composition of Sample B15 (polyolefin wax:fluorene resin=1:6) causes the recorded image to crack.

The invention is not limited to the above-described embodiments and Examples, and various modifications may be made. For example, the invention includes substantially the same form as the disclosed embodiments (for example, a form including the same function and method and producing the same result, or a form having the same intent and producing the same effect). Some elements unessential to the form of the disclosed embodiment may be replaced. The form of an embodiment of the invention includes an element producing the same effect or achieving the same object, as the form of the disclosed embodiments. The forms of the disclosed embodiments may be combined with the known art.

What is claimed is:

1. A white ink jet ink water based composition comprising:
   water,
   a white pigment, wherein the content of white pigment is 1% to 20% by mass; and
   fixing resins including a vinyl chloride resin, a fluorene resin, and a polyolefin wax,
   wherein the vinyl chloride resin is resin particles dispersed in water, and
   wherein the mass ratio of the vinyl chloride resin to the fluorene resin is 5:1 to 1:6 and the mass ratio of the polyolefin wax to the fluorene resin is 3:2 to 1:5.

2. The white ink jet ink water based composition according to claim 1, wherein the vinyl chloride resin content is in the range of 0.5% to 10% by mass.

3. The white ink jet ink water based composition according to claim 1, wherein the polyolefin wax has an average particle size in the range of 30 to 700 nm.

4. A recorded material comprising an image recorded with the white ink jet ink water based composition as set forth in claim 1.

5. The white ink jet ink composition according to claim 1, wherein the vinyl chloride has a minimum film forming temperature of 30° C. or more.

6. The white ink jet ink composition according to claim 1, wherein the white pigment has an average particle size in the range of 200 to 400 nm.

7. The white ink jet ink composition according to claim 1, wherein the polyolefin wax content is in the range of 1% to 3% by mass.

8. The white ink jet ink composition according to claim 1, wherein the polyolefin wax is resin particles dispersed in water.

9. A white ink jet ink composition comprising:
   a white pigment, wherein the content of white pigment is 1% to 20% by mass and the white pigment has an average particle size in the range of 200 to 400 nm;
   water; and
   fixing resins including a vinyl chloride resin, a fluorene resin, and a polyolefin wax,
   wherein the mass ratio of the polyolefin wax to the fluorene resin is 3:2 to 1:5.

10. A recorded material comprising an image recorded with the white ink jet ink composition as set forth in claim 9.

11. The white ink jet ink composition according to claim 9, wherein the polyolefin wax content is in the range of 1% to 3% by mass.

12. The white ink jet ink composition according to claim 9, wherein the polyolefin wax is resin particles dispersed in water.

* * * * *